(12) United States Patent
Howard et al.

(10) Patent No.: US 12,141,648 B2
(45) Date of Patent: Nov. 12, 2024

(54) FIXED RETAIL SCANNER WITH ON-BOARD ARTIFICIAL INTELLIGENCE (AI) ACCELERATOR MODULE AND RELATED METHODS

(71) Applicant: Datalogic IP Tech S.R.L., Bologna (IT)

(72) Inventors: Brett Howard, Eugene, OR (US); Aric Zandhuisen, Eugene, OR (US); Stefano Santi, Eugene, OR (US); Matt Monte, Eugene, OR (US); Keith Rogers, Eugene, OR (US); Alexander McQueen, Eugene, OR (US); Alan Guess, Eugene, OR (US)

(73) Assignee: Datalogic IP Tech S.R.L., Bologna (IT)

( * ) Notice: Subject to any disclaimer, the term of this patent is extended or adjusted under 35 U.S.C. 154(b) by 0 days.

(21) Appl. No.: 18/086,541

(22) Filed: Dec. 21, 2022

(65) Prior Publication Data
US 2023/0206014 A1    Jun. 29, 2023

Related U.S. Application Data

(60) Provisional application No. 63/293,596, filed on Dec. 23, 2021.

(51) Int. Cl.
G06K 7/10    (2006.01)
G06K 7/14    (2006.01)

(52) U.S. Cl.
CPC ....... *G06K 7/10722* (2013.01); *G06K 7/1096* (2013.01); *G06K 7/1417* (2013.01); *G06K 7/1482* (2013.01)

(58) Field of Classification Search
CPC ............. G06K 7/10722; G06K 7/1096; G06K 7/1417; G06K 7/1482; G06N 3/06; G06N 3/063; G06N 3/067
See application file for complete search history.

(56) References Cited

U.S. PATENT DOCUMENTS

| | | |
|---|---|---|
| 8,430,318 B2 | 4/2013 | McQueen et al. |
| 9,004,359 B2 | 4/2015 | Shearin et al. |
| 9,305,198 B2 | 4/2016 | Thompson et al. |
| 10,049,247 B2 | 8/2018 | Gao |
| 10,248,896 B2 | 4/2019 | Gao et al. |
| 11,662,986 B1 * | 5/2023 | Catron ................. G06F 8/41 718/104 |
| 2020/0125812 A1 | 4/2020 | Canini et al. |
| 2021/0295078 A1 * | 9/2021 | Barkan ............ G06V 30/2247 |

* cited by examiner

*Primary Examiner* — Laura A Gudorf
(74) *Attorney, Agent, or Firm* — Foley & Lardner LLP

(57) ABSTRACT

The disclosure includes a fixed retail scanner including a data reader, comprising a main board including one or more processors including a system processor, one or more camera modules, and an artificial intelligence (AI). The system processor is configured to transmit image data received from the one or more camera modules responsive to one or more event triggers detected by the system processor, and wherein the AI accelerator is configured to perform analysis based on an AI engine local to the AI accelerator in response to the event trigger. A remote server may also be operably coupled to the fixed retail scanner through the multi-port network switch, the remote server having a remote AI engine stored therein, wherein the local AI engine within the fixed retail scanner is a simplified AI model relative to the remote AI engine within the remote server.

20 Claims, 10 Drawing Sheets

FIXED RETAIL SCANNER WITH ON-BOARD ARTIFICIAL INTELLIGENCE (AI) ACCELERATOR MODULE AND RELATED METHODS

PRIOR APPLICATIONS

This application claims the benefit of U.S. Provisional Application No. 63/293,596, filed Dec. 23, 2021, and entitled "FIXED RETAIL SCANNER WITH ON-BOARD ARTIFICIAL INTELLIGENCE (AI) ACCELERATOR MODULE AND RELATED METHODS," the disclosure of which is incorporated by reference herein in its entirety.

TECHNICAL FIELD

The present disclosure relates generally to scanners or code readers, and more particularly, to fixed retail scanners having an on-board artificial intelligence (AI) accelerator module and related methods.

BACKGROUND

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items.

BRIEF SUMMARY

A fixed retail scanner may include a data reader comprises a main board including one or more processors including a system processor disposed within the data reader; one or more camera modules disposed within the data reader and operably coupled with the system processor; and an artificial intelligence (AI) accelerator operably coupled with the system processor, wherein the system processor is configured to transmit image data received from the one or more camera modules responsive to one or more event triggers detected by the system processor, and wherein the AI accelerator is configured to perform analysis based on an AI engine local to the AI accelerator in response to the event trigger.

A data reading system may include a fixed retail scanner comprising: a main board including a system processor configured to perform decoding of barcodes on one or more items; and an artificial intelligence (AI) accelerator having a local AI engine stored therein; and a remote server operably coupled to the fixed retail scanner through the multi-port network switch, the remote server having a remote AI engine stored therein, wherein the local AI engine within the fixed retail scanner is a simplified AI model relative to the remote AI engine within the remote server.

DETAILED DESCRIPTION

Figure 1:
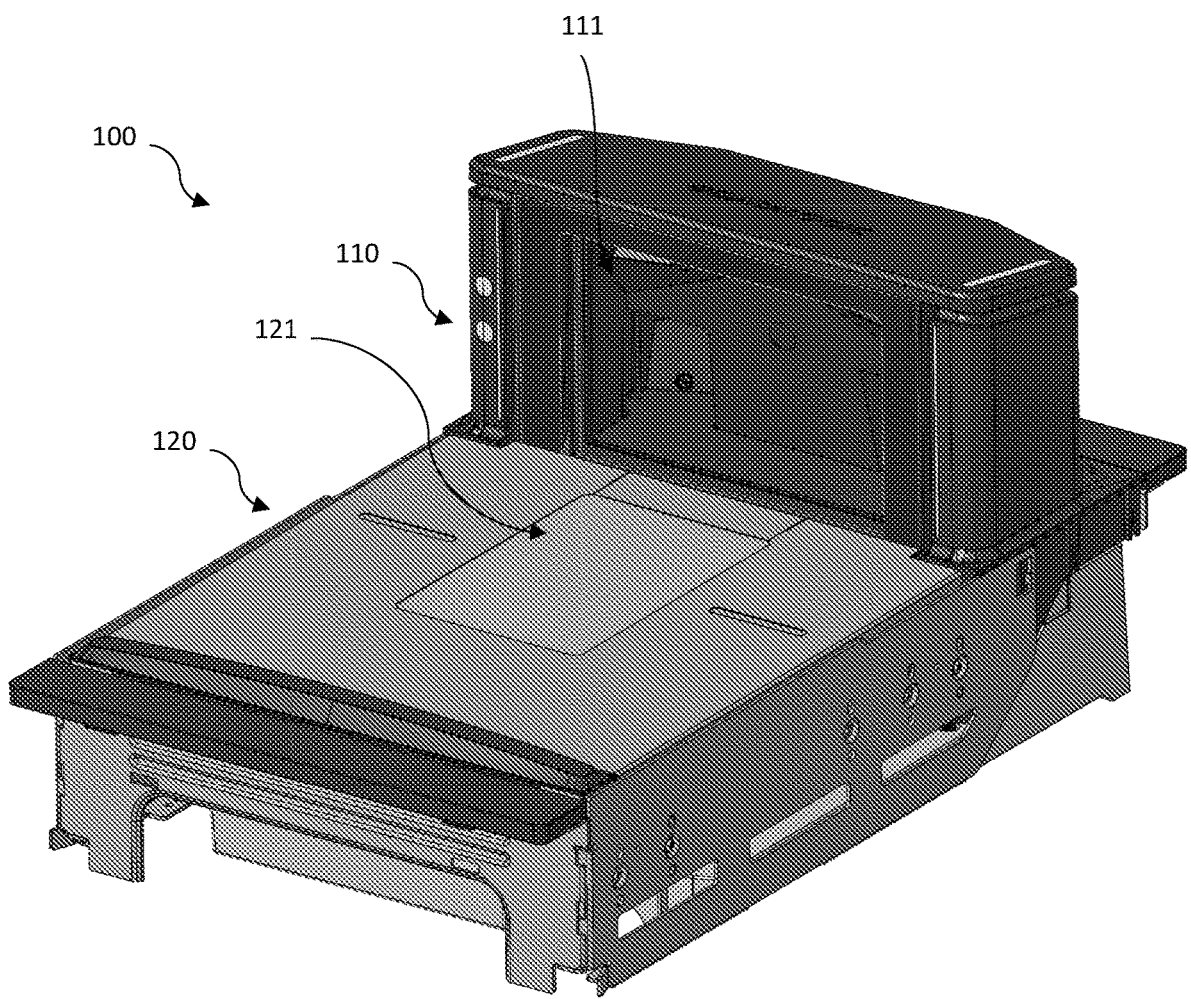
FIG. 1 is a perspective view of a data reader according to an embodiment of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

"Image data" as used herein may include raw images as well as processed images (e.g., cropped, compressed, etc.) from the raw images as well as other forms of data that is derived from raw image data that provides useful information for image analysis, such as descriptor data, histogram data, etc. Image data may include both individual image frames as well as multiple frames (e.g., streaming video). In some embodiments, raw images may include information arranged in two dimensions which are the x (width) and y (height) coordinates of a 2D sensor. The information at each x, y coordinate may include monochrome data, RGB data, depth data, multi-spectral data, infrared data, etc. as well as combinations thereof (e.g., RGB-depth may be captured by 3D cameras). Image data may be captured by one or more imagers positioned at various within the housing of the fixed retail scanner, such as in a horizontal base unit or a vertical bonnet of a bi-optic scanner having imagers positioned in two different planes. Single plane scanners (e.g., horizontal or vertical only housings) are also contemplated and within the scope of the disclosure. Image data may also be captured by one or more imagers positioned external to the primary scanning unit, such as peripheral devices (e.g., top-down reader imagers, security imagers, bottom of basket readers, etc.) that may also provide image data to the fixed retail scanner and/or remote systems. In some cases, image data and images may be used interchangeably herein.

FIG. 1 is a perspective view of a data reader 100 according to an embodiment of the disclosure. The data reader 100 may be a bi-optic fixed retail scanner having a vertical housing 110 and a horizontal housing 120. The vertical housing 110 may include a structure that provides for one or more camera fields-of-view (through a vertical window 111) within a generally vertical plane across the read zone of the data reader 100. The vertical structure provides an enclosure for one or more cameras and other optical elements (e.g., lenses, mirrors, etc.) and electrical elements (e.g., cables, circuit boards, etc.) therein. The horizontal housing 120 may include a structure that provides for one or more camera fields-of-view (through a horizontal window 121) within a generally vertical plane across the read zone of the data reader 100. The horizontal structure provides an enclosure for one or more cameras and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

Figure 2:
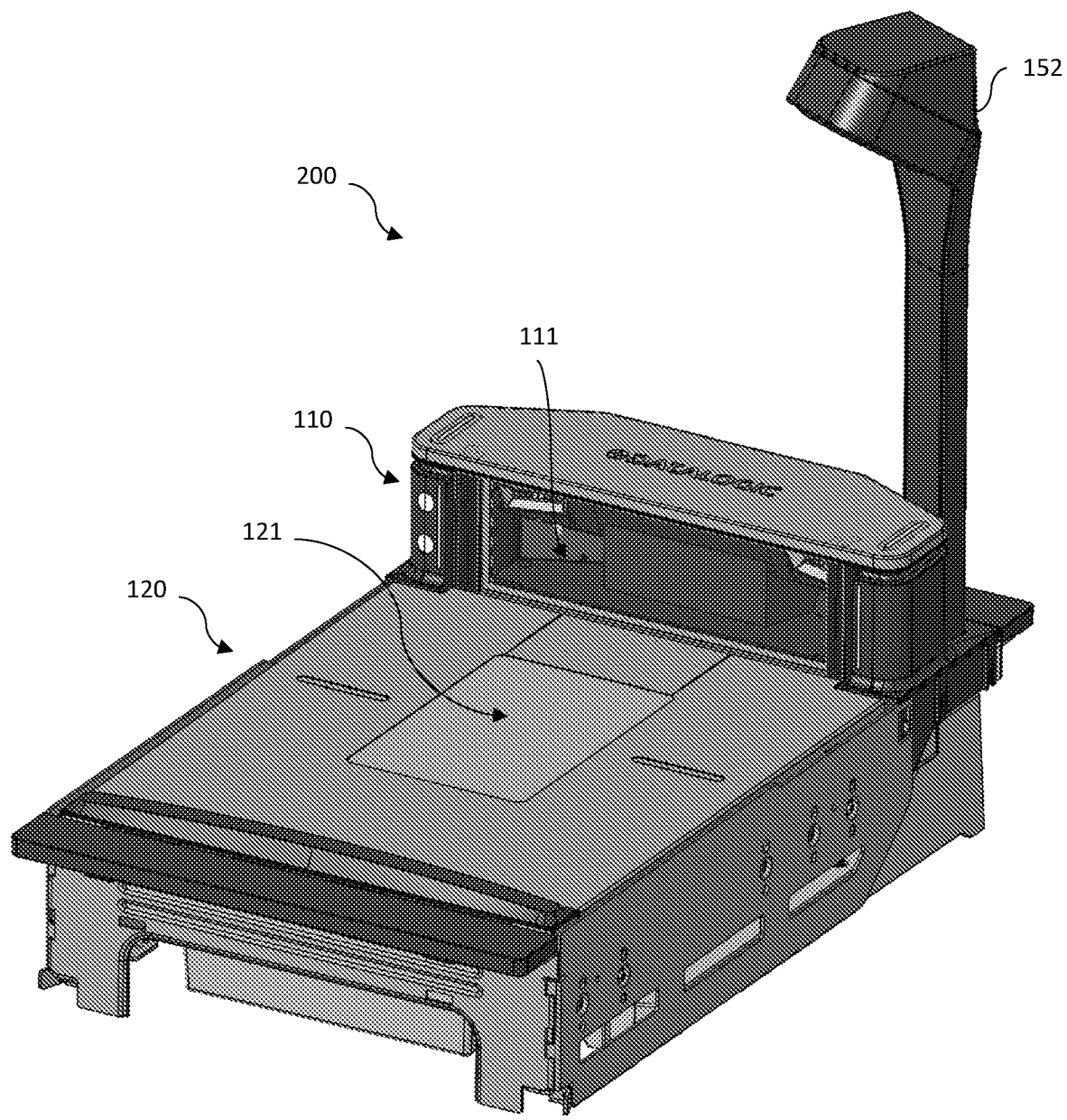
FIG. 2 is a perspective view of a data reader according to an embodiment of the disclosure.

FIG. 2 is a perspective view of a data reader 200 according to an embodiment of the disclosure. As with the data reader of FIG. 1, the data reader of FIG. 2 may also be a bi-optic fixed retail scanner having a vertical housing 110 and a horizontal housing 120. The data reader 200 may also include a top-down reader (TDR) 152 that includes a stand connected to the data reader 100 with a head that includes one or more imagers therein. Such imager(s) typically provide a generally close overhead (angled) view of the read zone to provide a top view of a product whereas internal cameras may be better suited for capturing images of the bottom and/or sides of the object within the read zone.

The vertical housing of FIG. 2 may have a lower profile bonnet compared to that of FIG. 1, which may result in internal cameras having a lower incidence angle. Thus, such a form factor may be particularly well suited to include the TDR 152 as an optional add-on to the data reader 200. However, a TDR 152 may also be coupled to the data reader 100 of FIG. 1 having the taller bonnet. Such a TDR may need to be taller to accommodate the taller bonnet. In addition, some embodiments may include additional TDRs such as on the other side of the bonnet to provide another top view of the read zone. Thus, some embodiments may include one or more TDRs for data readers having different sized bonnets. It is also recognized that some embodiments may include single plane data readers such that certain features described herein are wholly located within a single plane housing (e.g., horizontal) which may further be coupled to other external devices or peripherals.

Different configurations and details regarding the construction and components of a fixed retail scanner are contemplated. For example, additional features and configurations of devices are described in the following patents and patent applications: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READER," U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Patent Application Publication No. 2020/0125812, filed Dec. 2, 2019, and entitled "DATA COLLECTION SYSTEMS AND METHODS TO CAPTURE IMAGERS OF AND DECODE INFORMATION FROM MACHINE-READABLE SYMBOLS," the disclosure of each of which is incorporated by reference in their entirety. Such fixed retail scanners may be incorporated within assisted checkout stations having a clerk assisting a customer, while some embodiments include self-checkout stations in which the customer is the primary operator of the device. Such components and features may be employed in combination with those described herein.

Figure 3:
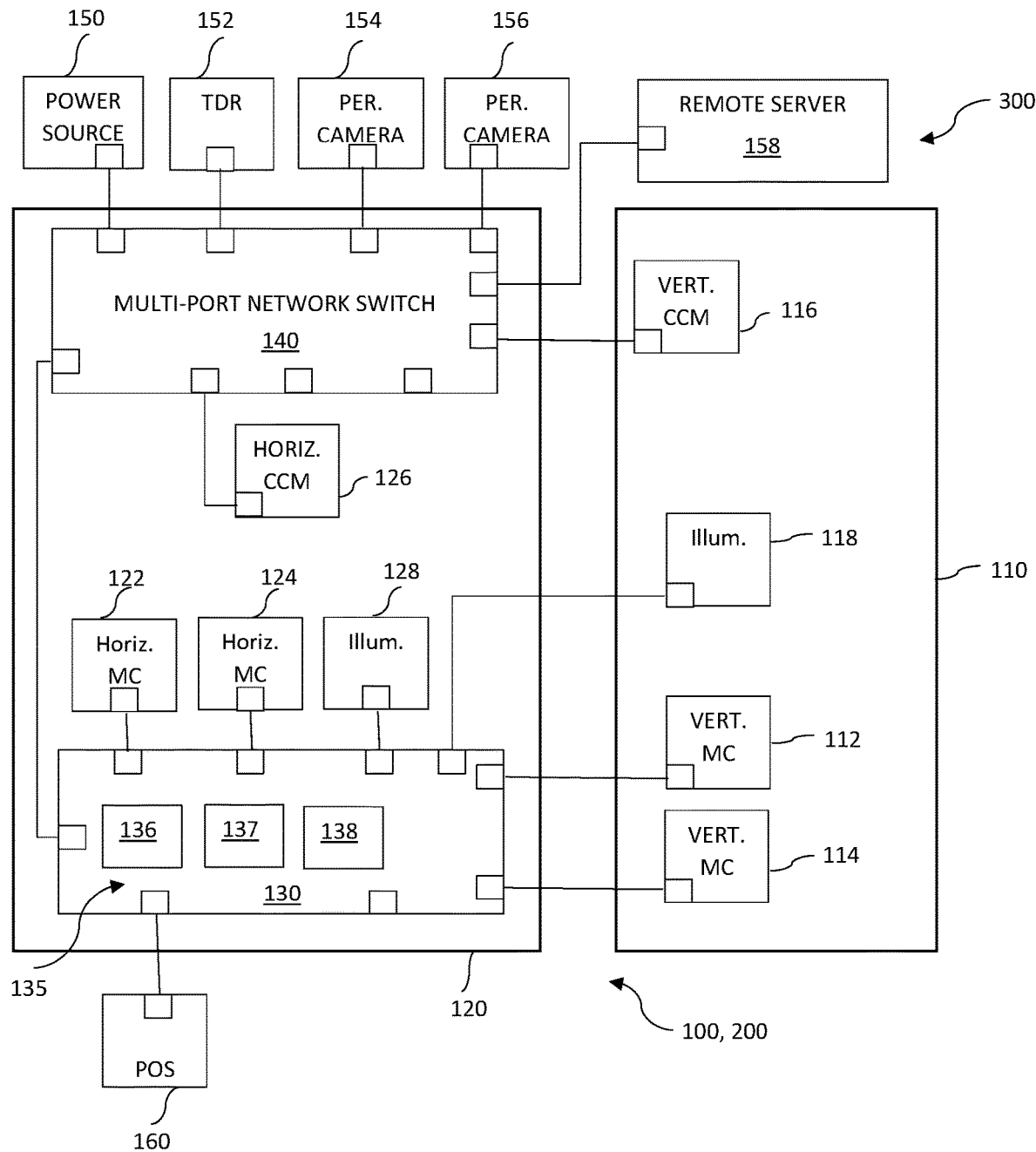
FIG. 3 is a simplified block diagram of a data reading system according to an embodiment of the disclosure.

FIG. 3 is a simplified block diagram of a data reading system 300 according to an embodiment of the disclosure. The data reading system 300 may include a data reader 100, 200 that may be operably coupled with one or more of a power source 150, the top-down reader (TDR) 152, peripheral cameras 154, 156, a remote service 158, or a point of sale (POS) system 160.

The data reader 100, 200 may be a bi-optic fixed retail scanner having a vertical housing 110 and a horizontal housing 120. The data reader 100, 200 may be installed in a retail environment (e.g., grocery store), which is typically disposed within a counter or other support structure of an assisted checkout lane or a self-checkout lane. The vertical housing 110 may include a structure that provides for one or more camera fields-of-view (through a vertical window) within a generally vertical plane across the read zone of the data reader 100, 200. The vertical structure provides an enclosure for one or more cameras 112, 114, 116, active illumination elements 118 (e.g., LED assemblies), and other optical elements (e.g., lenses, mirrors, etc.) and electrical elements (e.g., cables, circuit boards, etc.) therein. The horizontal housing 120 may include a structure that provides for one or more camera fields-of-view (through a horizontal window) within a generally vertical plane across the read zone of the data reader 100, 200. The horizontal structure provides an enclosure for one or more cameras 122, 124, 126, active illumination elements 128 (e.g., LED assemblies), and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

The data reader 100, 200 may include one or more different types of imagers, such as monochrome imagers and/or color imagers. For example, vertical monochrome cameras (MCs) 112, 114 may be configured to capture monochrome images through the vertical window of the data reader 100, 200. Likewise, horizontal monochrome cameras (MCs) 122, 124 may be configured to capture monochrome images through the horizontal window of the data reader 100, 200. Vertical color camera module (CCM) 116 may be configured to capture color images through the vertical window of the data reader 100, 200. Likewise, horizontal color camera module (CCM) 126 may be configured to capture color images through the horizontal window of the data reader 100, 200. Monochrome images may be analyzed (e.g., by a decoder) to decode one or more indicia (e.g., 1D barcodes, 2D barcodes, optical character recognition, digital watermarks, etc.). Color images may be analyzed (e.g., by an image processor) to perform analysis on the images where color information may be particularly advantageous, such as produce recognition, item recognition or verification, security analysis. Such analysis may be performed by local and/or remote processors that may contain an artificial intelligence (AI) engine or otherwise configured to perform other machine learning techniques.

The data reader may further include a main board 130 and a multi-port network switch 140. As shown herein, the main board 130 and the multi-port network switch 140 may be physically housed within the horizontal housing 120. Bi-optic readers tend to have larger horizontal housings in order to provide support for the device within a cavity in a counter, which also provides space for a scale (not shown) used to weigh produce or other items sold by weight or otherwise perform weighing of items when placed on the horizontal surface (often called a "weigh platter"). It is contemplated that some embodiments may include the main board 130 and/or the multi-port network switch 140 to be physically located within the vertical housing 110. In such an embodiment where one of the multi-port network switch 140 or the main board 130 is physically located within the vertical housing 110 and the other is physically located within the horizontal housing 120, the two boards may be oriented generally orthogonal to each other similar to the orientation of the windows or other angled arrangements (e.g., slightly angled orientations such as being in the range of ±10° from orthogonal). The ports may be at least somewhat aligned in the orthogonal direction or other arrangement to accommodate easy connection of network cables therebetween.

The main board 130 may be operably coupled with the vertical monochrome imagers 112, 114 and the horizontal monochrome imagers 122, 124. These connections may be via a communication interface (e.g., a MIPI interface). The main board 130 may have decoding software embedded therein such that one or more on-board processors 135 may receive monochrome images to perform decoding on the optical indicia and provide the decoding result to a point of sale (POS) system 160 operably coupled thereto to complete a transaction. The one or more on-board processors 135 may also be configured to provide control (e.g., coordination or synchronization) of the various components of the system including camera exposure and timing of active illumination assemblies 118, 128 of the system. It is contemplated that some embodiments may include multiple processing components (e.g., microprocessors, microcontrollers, FPGAs, etc.) configured to perform different tasks, alone or in combination, including object detection, system control, barcode decoding, optical character recognition, artificial intelligence, machine learning analysis, or other similar processing techniques for analyzing the images for product identification or verification or other desired events.

As an example, the one or more on-board processors 135 may include a system processor 136 configured to control system operations (e.g., illumination/camera exposure control) as well as perform certain analysis operations (e.g., barcode decoding). The one or more on-board processors 135 may also include image processor(s) 137 configured to receive and format image data from the cameras 112, 114, 122, 124 before being received by the system processor 136. In some embodiments, multiple image processors may be present such that each camera 112, 114, 122, 124 may have its own image processor associated therewith. In some embodiments, cameras may share an image processor for transmission to the system processor 136. For example, a single image processor (e.g., FPGA) may be configured to combine (e.g., concatenate) the image data from each of the monochrome cameras 112, 114, 122, 124 for the system processor to receive multiple views at a single point in time through one input. An example of such a process is described in U.S. Patent Publication No. 2022/0207969, filed Dec. 31, 2020, and entitled "FIXED RETAIL SCANNER WITH ANNOTATED VIDEO AND RELATED METHODS," the disclosure of which is incorporated by reference in its entirety.

The one or more on-board processor 135 may also include an AI accelerator module 138. The AI accelerator module 138 may include a tensor processing unit (TPU) configured to run artificial intelligence or other neural network machine learning models from an on-board processor (e.g., ASIC) disposed locally on the main-board 130 within the system. As an example, AI accelerator module 138 may be implemented with a Coral Mini PCIe Accelerator or other similar TPU products available from Google Inc. of Mountain View, California configured to perform local AI functionality to the on-board system using the TensorFlow open-source software library for machine learning and artificial intelligence. Such a PCIe accelerator may be a PCB card inserted directly into a mini PCIe slot connector located on the main board 130. In some embodiments, the accelerator module 138 may be installed directly on-board, such as the Coral Accelerator Module, which is a solderable multi-chip module including the Edge TPU available from Google Inc. of Mountain View, California. Other types of connections are contemplated, including a USB connected AI accelerator inserted into a USB slot. An example of such an accelerator module 138 is the USB accelerator available from Google Inc. of Mountain View, California.

Figure 5:
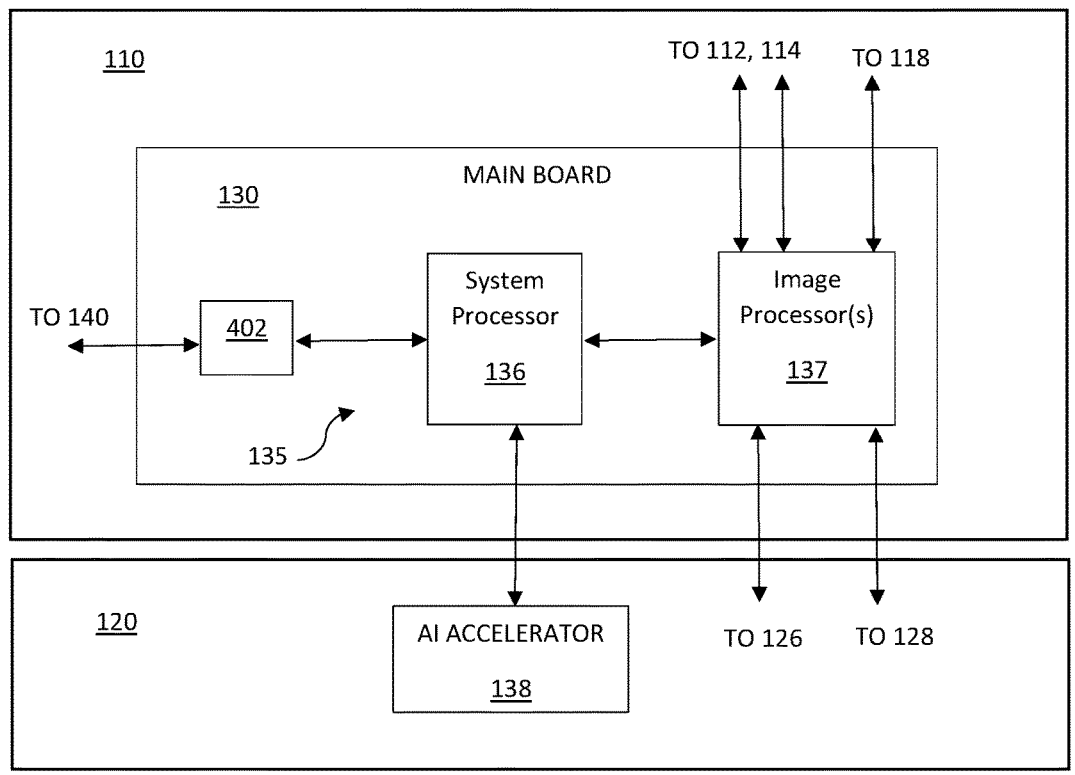
FIG. 5 is a simplified block diagram of certain components mounted on the main board in communication with an AI accelerator disposed within a vertical housing according to an embodiment of the disclosure.

In some embodiments, the AI accelerator module 138 may be physically disposed within the vertical housing 110 and connected to the main board 130 via an extension cable having a connector that is inserted into the corresponding port (e.g., mini PCIe slot, USB slot, etc.) as shown in FIG. 5. In some embodiments, the AI accelerator module 138 may be physically disposed within the horizontal housing 120 and connected to the main board 130 via an extension cable having a connector that is inserted into the corresponding port (e.g., mini PCIe slot, USB slot, etc.), as shown in FIG. 5.

The multi-port network switch 140 may be operably coupled to vertical CCM 116 and horizontal CCM 126 located within the data reader 100, 200. The multi-port network switch 140 may also be operably coupled with main board 130 located within the data reader 100, 200. Multi-port network switch 140 may also be operably coupled to the power source 150 as well as peripheral devices, such as the TDR 152, peripheral cameras 154, 156, and/or the remote server 158. The number, and types of peripheral devices, may depend on a desired application within a retail environment. The TDR 152 may be configured as a stand connected to the data reader 100, 200 that typically provides a generally close overhead (angled) view of the read zone to provide a top view of a product whereas internal cameras 112, 114, 116, 122, 124, 126 may be better suited for capturing images of the bottom and/or sides of the object within the read zone. Peripheral cameras 154, 156 may be located remotely from the data reader 100, 200, such as being mounted on a ceiling or wall of the retail environment to provide additional views of the read zone or checkout area. Such views may be useful for security analysis of the checkout area, such as product verification, object flow, human movements, etc. Such analysis may be performed by a remote service or other local devices (e.g., located on or otherwise coupled to the main board 130 or Ethernet switch 140). Other peripheral devices may be located near the data reader 100, 200, such as a peripheral presentation scanner resting or mounted to a nearby surface, and/or a handheld scanner that also may be used for manual capturing by the user (e.g., checkout assistant or self-checkout customer). Such devices may be coupled directly to the main board 130 in some embodiments or to the multi-port network switch 140 if so enabled. As shown, the POS 160 may be coupled directly to the main board 130. Such a connection may be via communication interfaces such as USB, RS-232, or other such interfaces. In some embodiments, the POS 160 may be coupled directly to the multi-port network switch 140 if so enabled (e.g., as an Ethernet connected device).

The multi-port network switch 140 may be implemented on a separate board from the main board 130. In some embodiments, the multi-port network switch 140 may be implemented on the main board 130 that also supports the one or more processors 135 also described herein. The multi-port network switch 140 may include a plurality of ports to provide advanced network connectivity (e.g., Ethernet) between internal devices (e.g., CCMs 116, 126) within the data reader 100, 200 and external devices (e.g., TDR 152, peripheral camera(s) 154, 156, remote server 158, etc.) from the data reader 100, 200. Thus, the multi-port network switch 140 may provide an Ethernet backbone for the elements within the data reader 100, 200 as well as for external devices coupled to the data reader 100, 200 for control and/or managing data flow or analysis. As an example, multi-port network switch 140 may be implemented with a KSZ9567 Ethernet switch or other EtherSynch® product family member available from Microchip Technology Inc of Chandler, Arizona or other similar products or devices configured to provide network synchronization and communication with network-enabled devices. Embodiments of the disclosure may include any number of ports supported by the multi-port network switch to couple to both internal devices (e.g., main board, cameras, etc.) and external devices (e.g., peripheral cameras, TDR, illumination sources, remote servers, etc.) to provide a flexible platform to add additional features for connecting with the data reader 100, 200.

Although FIG. 3 shows one block for active illumination assemblies 118, 128 in each of the vertical and horizontal housings 110, 120, some embodiments may include multiple such assemblies in each of the horizontal and vertical housings 110, 120 in order to provide for different lighting options at different angles across the read zone. For example, the vertical housing 110 may include two (or more) illumination assemblies therein at different locations and/or different colors for a desired illumination field from the vertical view. Likewise, the horizontal housing 120 may include two (or more) illumination assemblies therein at different locations and/or different colors for a desired illumination field from the horizontal view. As shown herein, the illumination assemblies 118, 128 may be coupled directly to the main board 130. However, in some embodiments, additional components may be coupled within the path from the main board 130, such as a control panel or other such device. In yet other embodiments, the illumination assemblies 118, 128 may be coupled to the multi-port network switch 140 which may route triggering controls from the main board 130. TDR 152 and one or more of the peripheral cameras 154, 156 may also include associated illumination assemblies. Synchronization of such illumination sources may be managed by the multi-port network switch 140 as controlled by the main board 130. In some embodiments, the multi-port network switch may employ or leverage IEEE1588 Precision Time Protocol to synchronize the illumination system with remote cameras, which may enable clock accuracy in sub-microsecond range.

In operation, images may be captured by the cameras 112, 114, 116, 122, 124, 126. Monochrome images may be captured by monochrome cameras 112, 114, 122, 124 and color images may be captured by color cameras 116, 126. The multi-port network switch 140 may be configured to coordinate (e.g., synchronize) timing of camera exposure and active illumination (e.g., white illumination) with the color cameras 116, 126 (as controlled by the controller on the main board 130) to occur in an offset manner with the timing of the camera exposure and active illumination (e.g., red illumination) with the monochrome cameras 112, 114, 122, 124.

Image data (e.g., streaming video, image frames, etc.) from the color cameras 116, 126 may be routed through the multi-port network switch 140 to the processing/analysis modules located internal to the data reader 100, 200, such as the one or more on-board processors 135 supported by the main board 130. Similarly, from the TDR 152 and any peripheral cameras 154, 156 may be routed through the multi-port network switch 140 to the processing/analysis modules located internal to the data reader 100, 200, such as the one or more on-board processors 135 supported by the main board 130. Image data from the monochrome cameras 112, 114, 122, 124 may be sent to the processing/analysis modules internal to the data reader 100, 200, such as the one or more on-board processors 135 supported by the main board 130. If coupled directly to the main board 130, such monochrome images may be received by the main board 130 without being routed by the multi-port network switch 140.

Some analysis may be performed by the system processor 136, such as decoding indicia (e.g., 1D barcodes, 2D barcodes, watermarking, OCR, etc.) identified within the images. Thus, in some embodiments, barcode decoding may be performed on the monochrome images (e.g., received from the MCs 112, 114, 122, 124) and/or color images (e.g., received from the CCMs 116, 126 through switch 140) captured internally within the data reader 100, 200 by the one or more processors 135 (e.g., system processor 136) supported by the main board 130. In some embodiments, barcode decoding may be performed on the monochrome images and/or color images captured externally from the data reader 100, 200 (e.g., received from the TDR 152, peripheral cameras 154, 156 through switch 140) by the one or more processors 135 (e.g., system processor 136) supported by the main board 130.

Other analysis may be performed by the AI accelerator 138 located on the main board 130. In some embodiments, complex analysis (e.g., AI, neural network machine learning, OCR, object recognition, item validation, produce recognition, analytics, decoding, etc.) may be offloaded to the AI accelerator 138 located on-board the main board 130. Such image analysis may be performed locally by the AI accelerator 138 on the color images captured internally within the data reader 100, 200 (e.g., received from the CCMs 116, 126 through switch 140), on the monochrome images captured internally within the data reader 100, 200 (e.g., received from the MCs 112, 114, 122, 124), and/or image data captured by external devices (e.g., received from the TDR 152, peripheral cameras 154, 156 through switch 140).

The results of such analysis by the AI accelerator 138 may be transmitted to the system processor 136 for further analysis in some embodiments. The system processor 136 may analyze such results to control certain features, such as generate alerts, trigger additional image capturing, perform analytics, or perform other system actions (e.g., forward results to POS system 160). The results of such analysis by the AI accelerator 138 may be transmitted via the multi-port network switch 140 to the remote server 158 for further analysis in some embodiments. The remote server 158 may likewise perform analysis on such results generated by the AI accelerator 138 located on-board the main board of the data reader 100, 200.

Image data from the color cameras 116, 126 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the color images externally to the data reader 100, 200 by external devices coupled through the multi-port network switch 140. Such color images or other data stream may be routed directly to the network connected external devices through the multi-port network switch 140 without first being received by the main board 130 (if at all). In other words, image data may be communicated (e.g., passed) from at least one imager internal to the data reader through the at least one multi-port network device 140 and on to at least one external device bypassing the main board 130. Having a connection to both the main board 130 as well as to external devices via the multi-port network switch 140 enables image data to be provided to internal as well as external processing resources.

Image data from the monochrome cameras 112, 114, 122, 124 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the monochrome images externally to the data reader 100, 200 by external devices coupled through the multi-port network switch 140. Such monochrome images or other data stream may be routed to the network connected external devices to the multi-port network switch 140 after first being received by the main board 130.

Image data from the TDR 152 or other external peripheral cameras 154, 156 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on these images externally to the data reader 100, 200 by external devices coupled through the multi-port network switch 140. Such images or other data stream may be routed directly to the network connected external devices through the multi-port network switch 140 without first being received by the main board 130 (if at all).

The multi-port network switch 140 may be coupled to the main board 130 via a single cable configured to provide power and communication to the main board 130. Power may be provided to the system via power source 150 via the multi-port network switch 140, which in turn provides power (e.g., power over Ethernet (POE)) to the main board 130 and the color cameras 116, 126. Monochrome cameras 112, 114, 122, 124 and illumination assemblies 118, 128 may be powered via the main board 130.

Features of employing the multi-port network switch 140 as a primary backbone for communication and power to interface between both internal and external components of the system include enabling power, communications, and camera/illumination synchronization to occur over a single cable between such connected components. In addition, precision time protocol (PTP), generic precision time protocol (GPTP), time sensitive networking (TSN) may provide an improved synchronization (e.g., within 1 microsecond error) for an open standard, widely supported, single cable solution. In addition, scanner maintenance tools may be simplified via improved network connectivity.

In some embodiments, the multi-port network switch 140 may be disposed within an external module having its own housing separate from the data reader 100. The multi-port network switch 140 may, thus, be located outside of the bioptic housing of the data reader 100, but may operably couple to the main board 130 and internal devices (e.g., vertical CCM 116, horizontal CCM 126) as well other external devices (e.g., TDR 152, cameras 154, 156, server 158, etc.) for providing the network backbone for communication and/or power as described above.

Figure 4:
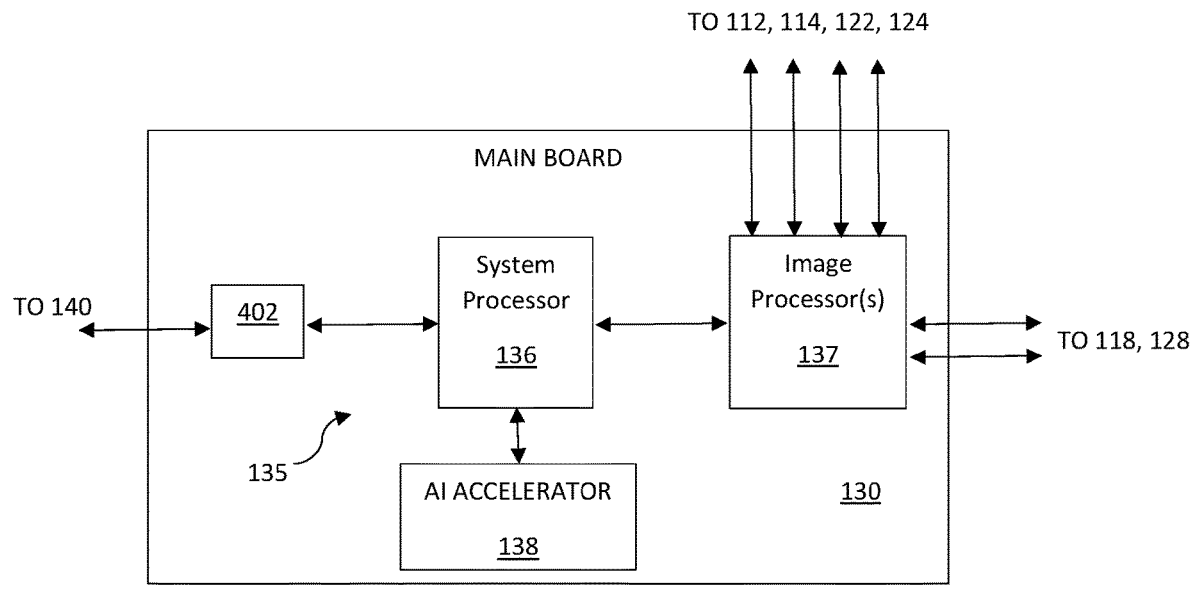
FIG. 4 is a simplified block diagram of certain components mounted on the main board according to an embodiment of the disclosure.

FIG. 4 is a simplified block diagram of certain components mounted on the main board 130 according to an embodiment of the disclosure. In particular, further details are provided regarding the one or more processors 135, which may include an Ethernet physical layer 402, a system processor 136, an image processor 137, and an AI accelerator 138. The system processor 136 may be coupled to each of the Ethernet physical layer 402, the image processor 137, and the AI accelerator 138. The Ethernet physical layer 402 coupled with the multi-port network switch 140 to provide an interface between the main board 130 and the multi-port network switch 140. The image processor 137 may be coupled to the monochrome imagers 112, 114, 122, 124 to provide control (e.g., sync signal) and to receive monochrome images therefrom. The image processor 137 may be configured to receive and format image data from the cameras 112, 114, 122, 124 before being received by the system processor 136. In some embodiments, multiple image processors may be present such that each camera 112, 114, 122, 124 may have its own image processor associated therewith. In some embodiments, cameras may share an image processor for transmission to the system processor 136. For example, a single image processor may be configured to combine (e.g., concatenate) the image data from each of the monochrome cameras 112, 114, 122, 124 for the system processor to receive multiple views at a single point in time through one input. Image processor 137 may also be coupled to the illumination assemblies 118, 128 to provide control thereto (e.g., sync signal). In some embodiments, the sync signal may be generated by one of the Ethernet physical layer 402 or the system processor 136, which may be based on a system clock signal.

Image data that may be provided to the AI accelerator 138 may be received from the system processor 136. Such image data may be captured by devices connected to the multi-port network switch 140, such as from the color camera modules 116, 126, the TDR 152, or other peripheral cameras 154, 156. Image data may also be received by the AI accelerator 138 that is captured by devices connected to the main board that bypass the multi-port network switch 140, such as from the monochrome camera modules 112, 114, 122, 126.

Figure 6:
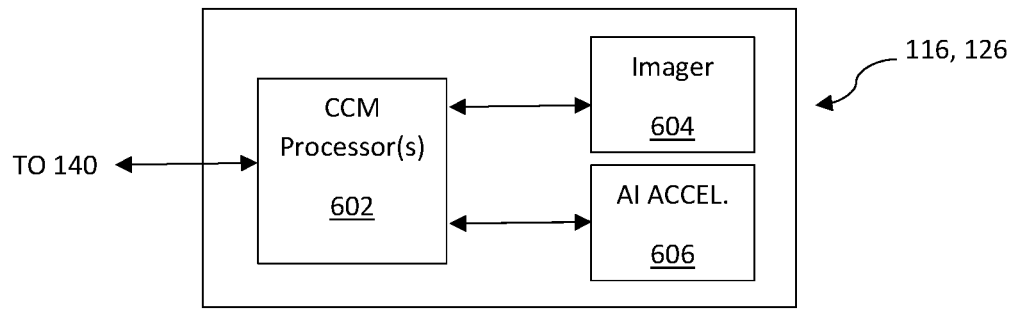
FIGS. 6-8 are different simplified block diagrams of the various imager modules according to an embodiment of the disclosure.
Figure 7:
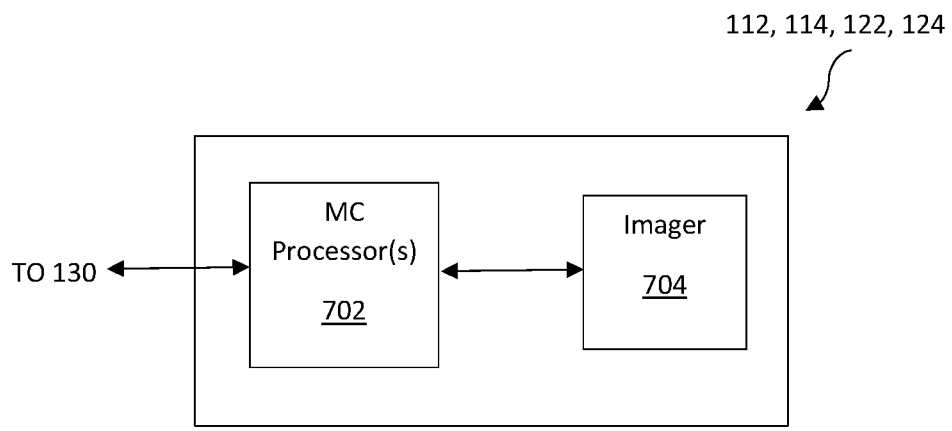
Figure 8:
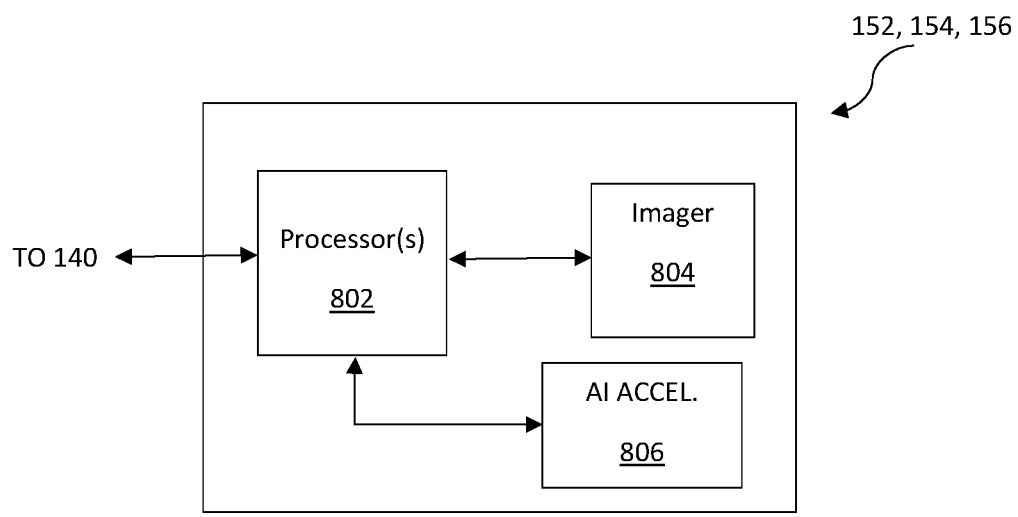

FIGS. 6-8 are different simplified block diagrams of the various imager modules according to an embodiment of the disclosure. For example, FIG. 6 may refer to one of the color camera modules 116, 126, FIG. 7 may refer to one of the monochrome camera modules 112, 114, 122, 124, and FIG. 8 may refer to one of the TDR 152 or peripheral cameras 154, 156 as examples. At least some of these camera modules may include their own on-board AI accelerator that may be integrated with other on-board components and processors. Examples are provided in which the color camera modules, TDR, or peripherals may include an on-board AI accelerator separate from that located on the main board, whereas the monochrome cameras do not include an AI accelerator. It is contemplated that monochrome cameras may include an AI accelerator while other camera modules do not.

Referring to FIG. 6, the color camera module 116, 126 may include a CCM processor 602 that couples to a color imager 604 and to the multi-port network switch 140. The CCM processor 602 may include one or more processors that perform different functions, such as control, formatting, and/or certain analysis functionality, etc. Active illumination for the color camera module 116, 126 may occur off-board via separate illumination assemblies 118, 128. In some embodiments, separate on-board processors may not be present for one or more of the CCM modules 116, 126 such that the control for such may be directly from the main board (e.g., system processor 404) and/or via the multi-port network switch 140 rather than with its own CCM processor 602.

In some embodiments, the color camera module 116, 126 may also include an AI accelerator 606 on-board the color camera module 116, 126. In some embodiments, the AI accelerator 606 may be surface mounted directly on the PCB of the color camera module 116, 126 along with the CCM processor 602 and the imager 604. The AI accelerator 606 of the color camera module 116, 126 may perform similar operations as described herein regarding the AI accelerator 138 of the main board 130. Having the AI accelerator 606 directly on-board with CCM processor 602 may provide latency advantages.

Referring to FIG. 7, the monochrome camera module 112, 114, 122, 124 may include a MC processor 702 that couples to a monochrome imager 704 and to the main board 130 directly. However, it is also contemplated that the monochrome imagers 704 may be connected to the multi-port network switch 140. The MC processor 702 may include one or more processors that perform different functions, such as control, formatting, and/or certain analysis functionality, etc. Active illumination for the MC camera module 112, 114, 122, 124 may occur off-board via separate illumination assemblies 118, 128. In some embodiments, separate on-board processors may not be present for one or more of the MC camera modules 112, 114, 122, 124 such that the control for such may be directly from the main board (e.g., system processor 404 and/or image processor 406) rather than its own MC processor 702.

Referring to FIG. 8, the TDR 152 or other peripheral cameras 154, 156 may include a processor 802 that couples to an imager 804 (e.g., color and/or monochrome depending on application) and to the multi-port network switch 140. The processor 802 may include one or more processors that perform different functions, such as control, formatting, and/or certain analysis functionality, etc. In some embodiments, certain camera modules (e.g., TDR 152 or other peripheral cameras 154, 156) may have their own active illumination assembly (not shown) associated therewith that may different than the illumination assemblies 118, 128 within the bioptic housing. The illumination assembly may be located on-board as shown or provided at a separate location, which may still be within the camera module housing. In some embodiments, separate on-board processors may not be present for the TDR 152 such that the control for such may be directly from the main board (e.g., system processor 404) and/or via multi-port network switch 140 rather than with its own TDR processor 802.

In some embodiments, the TDR 152 or other peripheral cameras 154, 156 may also include an AI accelerator 806 on-board the color camera module 116, 126. In some embodiments, the AI accelerator 806 may be surface mounted directly on the PCB of the color camera module along with the processor 802 and the imager 804. The AI accelerator 806 of the camera module may perform similar operations as described herein regarding the AI accelerator 138 of the main board 130. Having the AI accelerator 806 directly on-board with CCM processor 802 may provide certain latency advantages.

Various AI or other processing operations may be implemented by the system processor 136, AI accelerator 138, and/or the remote server 158 according to embodiments of the disclosure. Similarly, certain AI or other processing operations may be implemented by on-board camera processors such as CCM processor 602 (FIG. 6), MC processor 702 (FIG. 7), and/or processors 802 (FIG. 8) and/or on-board camera AI accelerators 606 (FIG. 6), 806 (FIG. 8) for cameras having such functionality. Examples of such operations are described below.

Products typically have many different symbols and other features that are located at consistent locations relative to each other for the particular product. For example, a product may have a barcode, a product logo, a company logo, a nutritional label, a recycling logo, digital watermark, or other identifying information that may be captured by different imagers of the scanner according to different time-correlated views. The scanner may be configured to generate a partial (or completely) composite image of the product based on images received from different camera views. Such views may be implemented within as a method for detecting fraud and/or assisting in the product identification. For example, if it is known where the barcode is located relative to other features, when a barcode is identified in a particular camera view it might also be known what part of the packaging other features may be located in other camera views. As a result, when a barcode is detected by a first camera, the AI engine may be trained to look for one or more known features being located in the image captured by other cameras based on the known positioning of the features relative to each other on the product. Thus, even if certain features are similar (e.g., wine bottle shape) other features may be sufficiently dissimilar (e.g., recycling symbol, nutritional label, unique colors) for the AI engine to be able to detect if a barcode has been swapped for a cheaper barcode even if the swapped barcode is associated with a product that has some similarities to the correct product. In some embodiments, the system may look for specific visual pattern recognition (ViPR) features (e.g., based on scale-invariant feature transform (SIFT) methodology) within other specific camera views where the features are expected to be present based on the triggering data.

It is described that the barcode read is the triggering data for then determining whether the product associated with the barcode has any other specific known features associated with product. Based on the camera that detected the barcode and its orientation within the frame, the processor may determine which camera views are expected to have those specific known features within the frame and then determine whether those features are, in fact, present in the image frames for the expected camera view. In some embodiments, the triggering data may be features other than the barcode, which may be useful if a barcode is obscured or damaged for item identification.

In some embodiments, color images from the color imagers (e.g., vertical CCM 116, horizontal CCM 126, and/or other color cameras if any) may be analyzed to determine a "preponderance of color" (e.g., via isolation and segmentation) to determine a general color (i.e., a preponderance of color metric) of the item without all fine details of the packaging. Preponderance of color metrics may be generated from color images captured from each camera view. For example, some items may have a preponderance of color for one side (e.g., front side of packaging) of the item and another preponderance of color for another side (e.g., back side of packaging, bottom of packaging, top of packaging, etc.) of the item. As a result, an image from a first camera view (e.g., horizontal CCM 126) that contains primarily the first side of the item may have a first preponderance of color metric associated therewith, and an image from a second camera view (e.g., vertical CCM 116) that contains primarily the second side of the item may have a second preponderance of color metric associated therewith. Some packaging may have a substantially uniform color scheme, in which case the preponderance of color metric for each time-correlated camera view may be substantially similar.

The preponderance of color metric(s) may be input into the AI engine as an additional factor to consider for item identification and/or validation purposes. For example, preponderance of color metrics may be generated for each time-correlated camera view and compared to expected preponderance of color for the different camera views relative to each other as a feature analyzed by the AI engine as discussed above. In some embodiments, the shape and/or orientation of the item may also be determined from the image in order to assist with the analysis to determine which side of the item is viewed by the camera and/or how much of other sides of the item may be viewed by the respective camera or should be viewed by other cameras in the system.

Figure 9A:
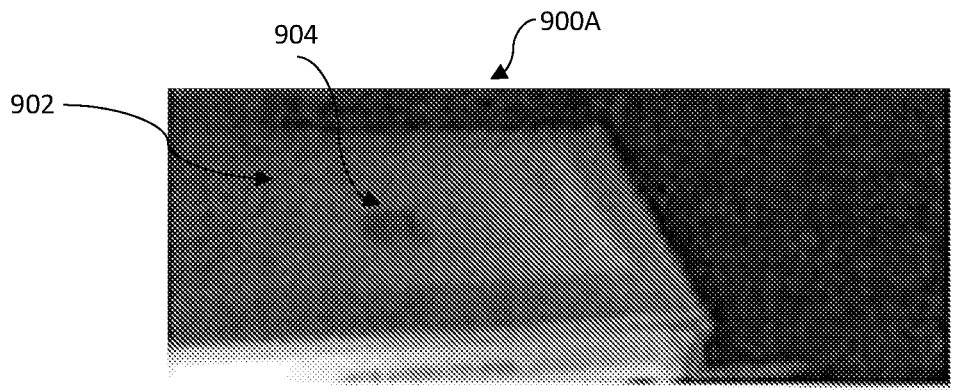
FIGS. 9A and 9B shows an item detected within fields-of-views of two different camera modules within the system according to an embodiment of the present disclosure.
Figure 9B:
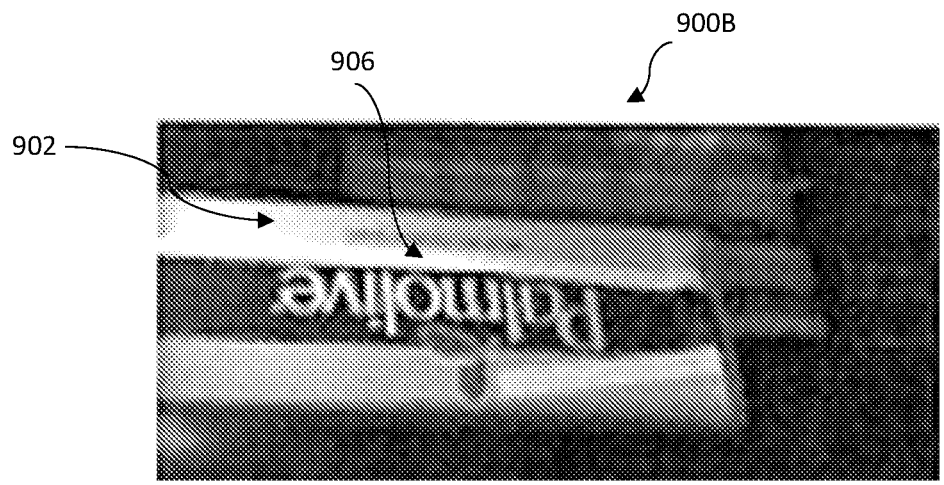
Figure 10A:
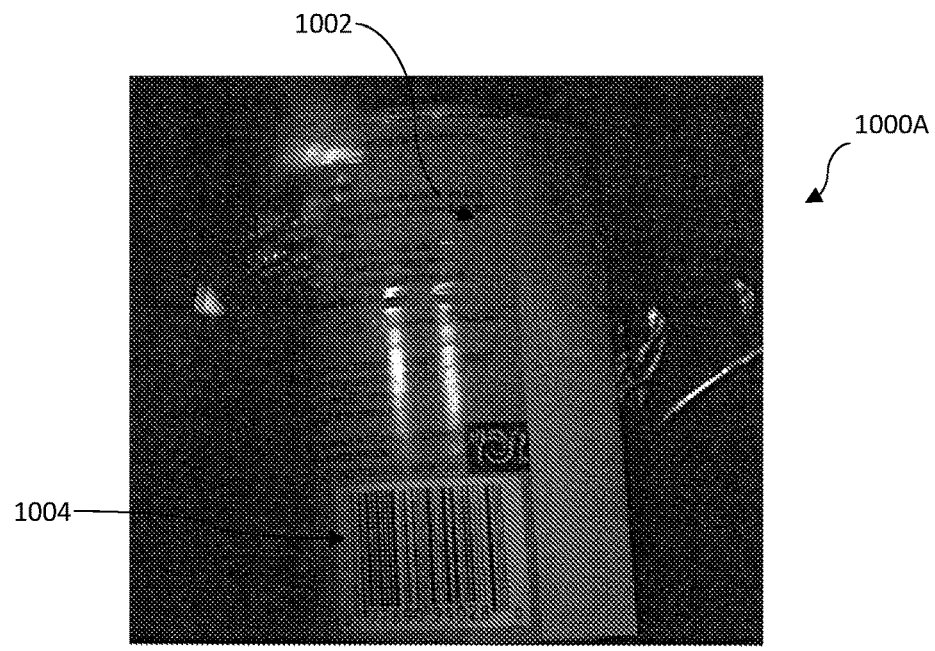
FIGS. 10A, 10B, and 10C shows an item detected within fields-of-views of three different camera modules within the system according to an embodiment of the present disclosure.
Figure 10B:
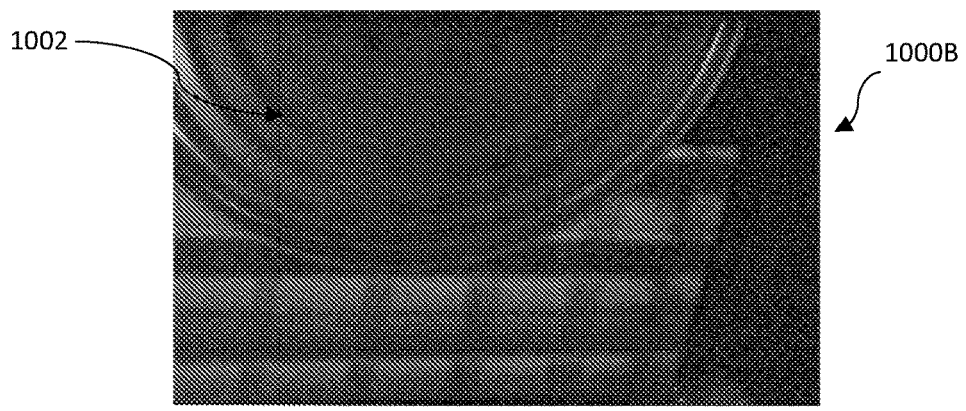
Figure 10C:
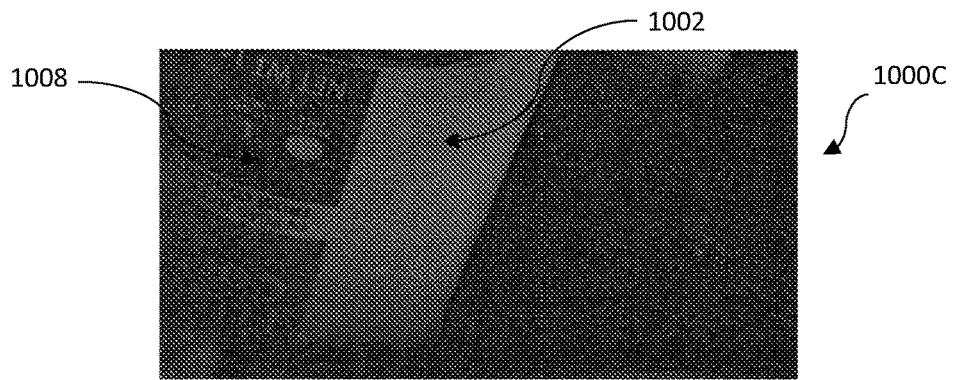

FIGS. 9A and 9B shows an item detected within fields-of-views of two different camera modules within the system according to an embodiment of the present disclosure. FIGS. 10A, 10B, and 10C shows an item detected within fields-of-views of three different camera modules within the system according to an embodiment of the present disclosure. As described above, the data reading system may be a flexible system that enables different camera modules (both internally and externally) to be connected to the data reader for different views of the area as desired. Thus, more camera views may be present-some of which may view the item at the same time while the item may be outside of the field-of-view of other cameras at the same time. The views shown in FIGS. 9A, 9B and FIGS. 10A, 10B, 10C are therefore meant to be illustrative and non-limiting to the number of camera modules and corresponding views available to the data reading system.

Referring specifically to FIGS. 9A and 9B, a first image 900A may contain an item 902 within a first field-of-view of a first camera. A second image 900B may contain the item 902 within a second field-of-view of a second camera. Additional camera views are also contemplated, but not shown in this example for convenience. Thus, the different fields-of-view provide different perspectives of the same item 902 from time-correlated images of different cameras. As a result, different features of the item 902 may be present in each of the different images 900A, 900B. For example, in FIG. 9A the barcode 904 may be viewable by the a first camera which may result in the barcode being decoded from analysis of the first image 900A. In FIG. 9B certain package features (e.g., "Palmolive," or other package color(s), design features, logos, etc.) may be present and viewable in the second image 900B captured by the second camera. The system processor 136 may provide the AI accelerator 138 or other AI engines with the frame (e.g., first image 900A) having the barcode image and other time-correlated views (e.g., second image 900B) so that expected features within the other time-correlated views may be confirmed. As an example, if the barcode is identified and decoded in the first image 900A, the product may be identified. In addition, other known features may also be associated with that product as well as the relative location of such features to the barcode. Based on the position and orientation of the barcode (and/or of the segmented item) within the first image 900A, it may be determined that at least a portion of the word "Palmolive" or other packaging features are expected to be present within the second image 900B captured by the second camera. If the AI engine confirms "Palmolive" is in the second image 900B, then the proper product may be confirmed. In some embodiments, the orientation of the barcode 904 may also inform the system to confirm the expected orientation of the other identifying features in the second image 900B (in this case, the wording being upside down) as another datapoint of confirmation during such validation. Other packaging features may include a preponderance of color metric for the images if the images are color images. For example, based on the determined item (e.g., based on barcode decoding, etc.), the expected color scheme packaging for the item may also be information known (e.g., trained) by the AI engine. Based on the position and orientation of the barcode (and/or of the segmented item) within the first image 900A, it may be determined the first image 900A is expected to have a first preponderance of color metric, and the second image 900B is expected to have a second preponderance of color metric. Some packaging schemes may have different expected metrics, while others may be expected to be the same for substantially uniform packaging color schemes. If the AI engine confirms the expected preponderance of color metric(s) for the first image 900A and the second image 900B, then the proper product may be confirmed (i.e., validated). If not confirmed, then an alert may be generated which may result in an exception to be handled (e.g., the transaction may be suspended and an assistant may be called to confirm the item, and/or other measures may be taken in response thereto).

Referring specifically to FIGS. 10A, 10B, and 10C, a first image 1000A may contain an item 1002 within a first field-of-view of a first camera. A second image 1000B may contain the item 1002 within a second field-of-view of a second camera. A third image 1000C may contain the item 1002 within a third field-of-view of a third camera. Additional camera views are also contemplated, but not shown in this example for convenience. Thus, the different fields-of-view provide different time-correlated images with different perspectives of the same item 1002. As a result, different features (e.g., item shape and/or orientation, package designs, markings, logos, words, color metrics, barcode, nutrition label, etc.) of the item 1002 may be present in each of the different images 1000A, 1000B, 1000C. For example, in FIG. 10A the barcode 1004 and other label information may be viewable by the first camera which may result in the barcode being decoded based on analysis of the first image 1000A. In FIG. 10B certain item features (e.g., bottom portion of a can) may be present in the second image 1000B captured by the second camera. In FIG. 10C certain additional item features (e.g., label and other design information) may be present in the third image 1000C captured by the third camera.

For example, if the barcode is identified and decoded in the first image 1000A the product may be identified. In addition, other known features may also be associated with that product as well as the relative location of such features to the barcode for confirmation via analysis of the other time-correlated images. In this case, the barcode may be associated with a product that is known to be a can and the label may be known to include special symbols 1008 such as the gluten free and lactose free symbols shown in FIG. 10C. Based on the position and orientation of the barcode and/or the segmented item within the first image 1000A, it may be determined that the product should be a can and features of the can (e.g., circular lines, edges, etc.) associated with an end of the can should be present within the second image 1000B captured by the second camera. It may also be determined that additional symbols 1008 (e.g., gluten free, lactose free) should be present within the third image 1000C captured by the third camera. In addition, based on the orientation of the barcode within the first image 1000A, it may be expected that the orientation of the gluten free and lactose free symbols may be upside down within the third image. In some embodiments, the position and orientation of the barcode and/or the segmented item within the first image 1000A may also yield a first expected preponderance of color metric for the side of the can including the barcode, and a second expected preponderance of color metric for the bottom of the can, and/or a third expected preponderance of color metric for the side of the can expected for the view from the third camera. One or more of these features may be confirmed to be present in their appropriate images as determined (expected) in order to validate and/or identify the item.

In some embodiments, the image data may transmit continuously to the AI accelerator 138. In some embodiments, certain data may be transmitted to the AI accelerator 138 such as, for example, being triggered by predetermined events. For example, predetermined events may include one or more of the following: item of an entry to the field-of-view, an item being located a particular position within the field-of-view, barcode decode of an item, identifying an item still in the field-of-view but for which a barcode no longer is present or no longer able to be decoded, hands or fingers being identified close to the barcode, detecting a weight (e.g., a stable weight), determining a security mismatch (e.g., barcode does not match other product features such as labeling, weight, etc.), motion detection, background detection, watermark detection, watermark decoding, excessive backward movement, identified a covered or partially covered barcode, and/or other pre-determined events or combinations thereof.

In some embodiments, the system processor 136 may be configured to identify one or more of such predetermined events during a first analysis process (e.g., during barcode decoding) and take an action in response thereto. For example, the system processor 136 may identify one or more predetermined events which triggers data to be sent to the AI accelerator 138 for further analysis on a more limited amount of data.

Different events may result in different responses by the system processor 136. For example, a successful barcode decode may trigger the system processor 136 to transmit the decoded image and/or a relatively small number a subsequent images (e.g., from the same camera and/or other time-correlated images captured by other cameras) to the AI accelerator 138 for quick verification (i.e., validation) of the item therein. In some embodiments, the subsequent images may be a single image or 'N' number of images set by the event rule. In some embodiments, subsequent images may be transmitted to the AI accelerator 138 until another predetermined event trigger is identified (e.g., item is no longer in field-of-view, stop request is received from AI accelerator 138, secondary analysis is completed, etc.).

In some embodiments, the event trigger may be identifying barcode segments (but not a full barcode being decoded). The system processor 136 may be configured to retrieve one or more images having a higher resolution from the cameras for subsequent analysis by the system processor 136 (e.g., barcode decoding, OCR) and/or transmitting the higher resolution image(s) to the AI accelerator 138 for further analysis therein.

Figure 11:
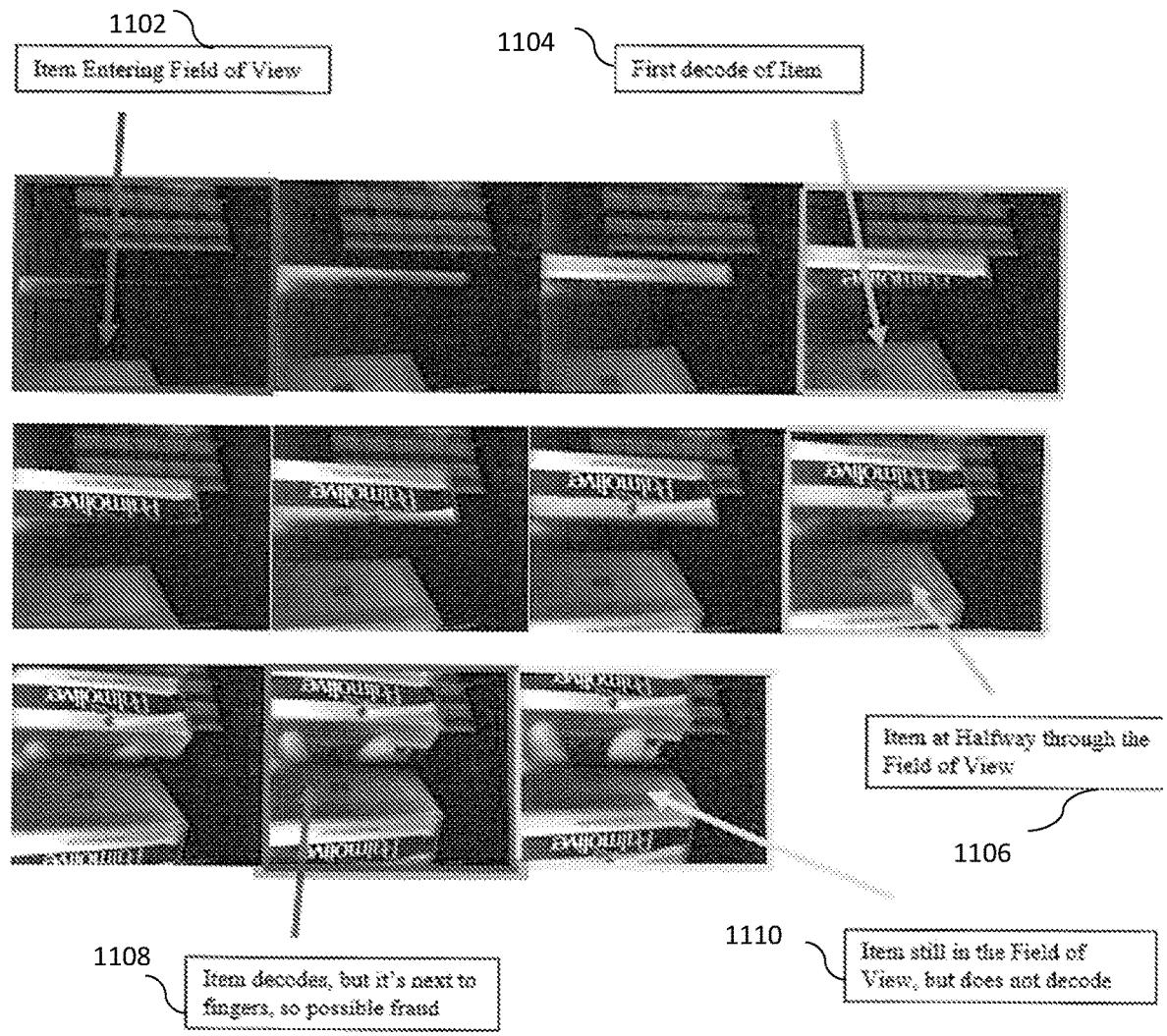
FIG. 11 shows different examples of predetermined event triggers that may be employed based on preliminary analysis of the image data according to an embodiment of the disclosure.

FIG. 11 shows different examples of predetermined event triggers that may be employed based on preliminary analysis of the image data according to an embodiment of the disclosure. In the example shown in FIG. 11, five different types of predetermined events are described. However, it is contemplated that different events and different actions in response to the events are within the scope of the disclosure. Different frames are shown (e.g., frames 1-11) as an example, and each frame shown in FIG. 11 includes images from two different camera views as an example. Thus, each frame shown in FIG. 11 is a concatenation of time-correlated image data from two different cameras. Thus, the top half of the frame includes the image data captured by the first camera, and the bottom half of the frame includes the image data captured by the second camera. These frames may be arranged differently (e.g., left half/right half) in some embodiments. In some embodiments, additional camera views are also contemplated. In such embodiments, time-correlated image data from more cameras may be combined to form combined frames with more than two sets of image data. Such combined frames may be arranged side-by-side, stacked from top-to-bottom, as a grid or array, or in other arrangements.

Each time a predetermined event is detected, the system processor 136 initiate a response with respect to image data being sent to the AI accelerator 138 for further analysis. Different predetermined events may be associated with different responses, including the number of frames of image data sent to the AI accelerator to be used in the analysis, the type of data (e.g., low resolution frames, high resolution frames, cropped images, descriptors, histogram data, color metrics, etc.) sent to the AI accelerator to be used in the analysis. In addition, the system processor 136 may indicate to the AI accelerator 138 what the triggering event is so that the AI accelerator 138 may know which type of analysis is to be performed in response to the incoming image data, which may include loading a different trained AI engine to be used in the analysis.

A first event 1102 (e.g., item entering the field-of-view) may be detected in frame 1 by the system processor 136, which may then trigger an action in response thereto. As one example, the system processor 136 may transmit image data used for this determination and/or image data for the next N frames (e.g., N=10 as an example) to the AI accelerator 138 for further analysis. In some embodiments, larger numbers of frames may be transmitted in video format to the AI accelerator 138. The number of frames may be relatively large in comparison to other event triggers as it may be used in an analysis using an AI engine trained for sequential analysis of data for analyzing motion or actions that may occur within the image data after an item enters the field of view. In some embodiments, the number (N) of frames may be variable as it may depend on the number of frames that the item remains within the field-of-view of the respective camera. In other words, in response to this particular event, the image data may be transmitted to the AI accelerator 138 or other AI engine until an event related to the item exiting the field of view is detected.

A second event 1104 (e.g., first successful decode of item) may be detected in frame 4 by the system processor 136, which may then trigger an action in response thereto. As one example, the system processor 136 may transmit image data used for this determination and/or image data for the next N frames (e.g., N=1 as an example) to the AI accelerator 138 for further analysis.

A third event 1106 (e.g., item is identified at approximately halfway into the frame or at another pre-determined position) may be detected in frame 8 by the system processor 136, which may then trigger an action in response thereto. As one example, the system processor 136 may transmit the image data used for this determination and/or next N frames (e.g., N=1 as an example) to the AI accelerator 138 for further analysis. The determination of position (e.g., halfway) may be based on image analysis to determine item shape and an approximate centroid for the item being located within a pixel range for the image or another desired method for determining item location (e.g., edge detection). Having an event trigger based on an item being located at or near the middle of the image may be useful for transmitting an image to the AI engine with a large portion of the image being within the field of view for analysis.

A fourth event 1108 (e.g., item decodes but there are fingers proximate to the barcode) may be detected in frame 10 by the system processor 136, which may then trigger an action in response thereto. As one example, the system processor 136 may transmit the image data used for this determination and/or next N frames (e.g., N=1 as an example) in full resolution to the AI accelerator 138 for further analysis.

A fifth event 1110 (e.g., item is still in the field-of-view, but the barcode does not decode) may be detected in frame 11 by the system processor 136, which may then trigger an action in response thereto. As one example, the system processor 136 may transmit the one or more full uncompressed images that contains the fingers to the AI accelerator 138 for further analysis.

The event-based rules of the system processor 138 may be represented as IF/THEN logic within the system processor 136. As non-limiting examples:

a. IF (item enters field-of-view), THEN (capture 10 imagers and transmit in H.264 video format)
b. IF (item has first decode), THEN (capture and transmit subsampled next available image)
c. IF (item decode AND fingers detected), THEN (capture and transmit full uncompressed image(s) that contains the fingers)
d. IF (weight detected by scale), THEN (transmit edge preserved subsampled image of item)
e. IF (motion detected), THEN (transmit 5 second video). Motion could be detected by other cameras coupled to the system, such as external peripheral cameras. Yet, the video transmitted may be from a different camera such as internal cameras (or video from multiple cameras-both internal and external).

In some embodiments, the triggering event may be provided by other inputs to the system. For example, a microphone may be used to analyze audio inputs to determine certain events, such as a crinkling sound (e.g., indicative of a bag) or another sound, that may be associated with the scanning of a certain item or a certain type of item. This triggering event information (e.g., predetermined sound detected) may be provided to the AI accelerator 138 along with image data that is analyzed together to provide a more accurate product identification and/or validation. In some embodiments, the material of a package may be determined from image analysis and/or decoding of a watermark that may include such data embedded with the watermark. Such a determination may also be provided to the AI accelerator 138 along with image data that is analyzed together to provide a more accurate product identification and/or validation.

In some embodiments, a temperature sensor may be used to detect a temperature for a product being scanned. For example, cold items (e.g., frozen or refrigerated) may be distinguished from room temperature items based on a particular temperature detected. Likewise, warm items (e.g., warm prepared deli items) may be distinguished from room temperature items based on a particular temperature detected. This triggering event information (e.g., predetermined temperature threshold crossed) may be provided to the AI accelerator 138 along with image data that is analyzed together to provide a more accurate product identification and/or validation.

In some embodiments, an olfactory sensor may be used to detect a smell for a product being scanned. For example, a produce item may be distinguished from other types of items being detected. This triggering event information (e.g., produce item detected) may be provided to the AI accelerator 138 along with image data that is analyzed together to provide a more accurate product identification and/or validation. For example, an AI engine particularly trained for produce recognition may be loaded for the limit the analysis to only produce recognition, which may improve the confidence in the results and/or reduce the time for performing the analysis. Identifying a produce item for triggering such an event may also be achieved in a different way, such as via pre-processing (e.g., imager processing) by the system processor 136 to determine generally that the item is likely a produce item even if the exact produce type is unknown. In response to such a trigger, the system processor 136 may transmit the image data (e.g., type of data, number of frames, which camera views, etc.) to the AI accelerator 138 for produce recognition analysis.

In some embodiments, a detected weight trigger may be used for the event trigger. This triggering event information (e.g., weight change detected, stable weight detected, etc.) may be provided to the AI accelerator 138 along with image data that is analyzed together to provide a more accurate product identification and/or validation. For example, an AI engine particularly trained for items typically priced by weight may be loaded for the limit the analysis to only such items, which may improve the confidence in the results and/or reduce the time for performing the analysis. This may be a different AI engine than strictly produce recognition described previously as it may include being trained for more items than just produce, such as bulk candy. In response to such a trigger, the system processor 136 may transmit the image data (e.g., type of data, number of frames, which camera views, etc.) to the AI accelerator 138 for analysis of items typically priced by weight.

The system processor 136 may indicate to the AI accelerator 138 what the triggering event was so that the AI accelerator 138 may know which type of analysis is to be performed on the incoming data. In some embodiments, the event-based trigger may be used to determine which AI engine (from among a set of AI engines) may be desired for a particular situation. Some AI engines may be hosted by the local AI accelerator 138, which may load a particular trained AI engine/data set based on a particular detected event. Some AI engines may be hosted by a remote service. For example, certain events may be better suited for local analysis, while other events may be better suited for remote analysis. Depending on the particular detected event, the system processor 136 may provide the image data and other data for request to either the AI accelerator 138 for local analysis, or to a remote server 158 for remote analysis.

In addition, multiple remote servers 158 (e.g., from different third party AI vendors) may be connected that each have different benefits in their AI offerings. The system processor 136 may be configured to act as a broker to different remote AI services that may be provided by different vendors/partners (e.g., third parties). For example, a first remote AI service may be more appropriate for produce recognition analysis, whereas a second remote AI service may be more appropriate for item recognition that is non-produce, while yet another third remote AI service may be more appropriate for security analysis (e.g., item validation, user gestures, etc.). Depending on the particular detected event, the system processor 136 may provide the image data and/or other information to the appropriate remote server responsive to the detected triggering event. As an example, if produce is detected (e.g., based on image analysis, weight, user input, etc.) the image data may be transmitted to the remote AI service most appropriate for produce recognition. Likewise, other detected events may trigger different responses including what data to provide to a particular AI service (e.g., local and/or remote). As an example, a first event of detecting item entry may trigger sending image data (e.g., predetermined N frames or until item exit is detected) to a first AI engine (e.g., local AI accelerator 138) for detecting motion or specific activities within sequential frames. During this time, a second event of item decoding may be detected, and which may trigger sending image data (e.g., one frame, for example) to a second AI engine (e.g., a different local AI accelerator or a remote server with an AI engine) for performing analysis thereof (e.g., item validation). At another time, third event may be detected, such as the item being detected as being halfway through the field of view and/or fully within the field of view without a decode being detected. As a result, the system processor 136 may transmit image data (e.g., one frame, for example) to another AI engine (e.g., a different local AI accelerator or a remote server with an AI engine) for performing analysis thereof (e.g., item identification). Thus, the system processor 136 may determine which event triggers which result (e.g., image data type, number of frames, etc.) to be performed by which AI engine that is part of the system. As a result, multiple AI activities may be performed simultaneously and tailored to specific types of analysis, which may enable certain security analysis to be performed at the same time as item identification, produce recognition, etc.

In some embodiments, a detected triggering event may be based on image data of one camera but may trigger an action by a different camera. For example, a triggering event (e.g., barcode read, fingers near barcode, etc.) may be detected by the system processor 136 based on the image data received by one or more monochrome cameras 112, 114, 122, 124, and the responsive action may affect image data from one or more different cameras, such as the color cameras 116, 126, TDR 152, and/or peripheral cameras 154, 156. As an example, the certain image data from one or more of these other cameras (depending on a particular triggering event) may be transmitted to the AI accelerator 138 for local analysis and/or to a remote server 158 for remote analysis.

In some embodiments, some complex analysis may be performed remotely (e.g., by remote server 158) and other complex analysis may be performed locally (e.g., by AI accelerator 138). In some embodiments, a limited set (e.g., simplified version) of the AI engine may be stored on the AI accelerator 138 and a larger set (e.g., more complex version) of the AI engine may be stored at the remote server 158. As an example, the AI accelerator 138 may be trained for a particular customer (e.g., grocery chain, local store, etc.) whereas the remote server 158 may be trained for use across multiple customers (e.g., a global database for use by different store chains) with more data available to the remote server 158. In some embodiments, the local AI engine may be limited to a subset of items of the total AI model, such as being based on items currently in stock (e.g., out of stock items may be deactivated, seasonal items may be activated/deactivated depending on the season, etc.). Thus, the local AI model may be updated based on current inventory data from the store (e.g., real-time or near-real time according to an update schedule).

In some embodiments, the local AI engine may be influenced by the current transaction itself. For example, as the list of items involved in the transaction is built (as products are scanned by the user), the AI engine may be trained to prioritize certain products when performing AI operations for item identification and/or validation. For example, as customers often purchase multiple items of the same item type (and scan them in close time proximity), the AI engine may be trained to start the processing/analysis based on the transaction list (e.g., based on a subset such as the 5 most recent items, or analyzing cold items within the AI model first after a cold item is scanned based on decoding or detected via a sensor) before expanding the analysis to other products in the AI model. In yet some embodiments, prioritization may be based on object size that may be determined by analysis of one or more of the camera views-such as the TDR analyzing the item within the image frame relative to reference points located on the platter or within the environment to estimate the size (e.g., dimensions, volume, etc.) of the item. Such size data may be input into the AI engine to prioritize the analysis and/or narrow the items that are part of the analysis.

Prioritization within the AI model may also be based on other factors such as prioritizing sale items or other commonly purchased items for a given seasonal time (e.g., turkey, stuffing, etc. close to thanksgiving; chips, soda, beer, etc. close to Super Bowl® Sunday, etc.) or items that are currently given a preferential location or current sale items within the store that are more likely to be purchased. In some embodiments, priority may be given to related items, for example, if a cereal is scanned, then subsequent scans may prioritize other types of cereals, milk, or other items that are commonly bought together. In some embodiments, trends across all transactions among all customers for a given time period (e.g., day or week) may also be prioritized in some situations where certain large scale behaviors occur that were not expected. Prioritization may also be based on known customer behaviors, such as for products where a customer is known to have been near in the store (based on customer tracking data). Thus, system level solutions (e.g., data from cart tracking, mobile device(s), security cameras, etc.) may also provide inputs to the AI engine if the path of the customer is known such that particular items from sections from the store can be prioritized in the ID/validation process where the customer was known to have been. In some embodiments, prioritization in the AI model may be given during a transaction for products in the customer's purchase history that are likely to be repeat purchases. As a result, the AI model may be temporarily adjusted to reflect such priorities based on macro or micro behaviors for a given customer and/or for a plurality of customers within a particular store or chain of stores. This adjustment may provide a more accurate and/or faster process of identification or validation of items.

In some embodiments a first attempt at identifying a product may be performed (e.g., in real-time) using the AI accelerator 138. If such attempt fails, a second attempt at identifying the product may be performed at the remote server 158 using more powerful resources available for complex analysis at the remote server 158. A tiered approach may be performed for local processing by the AI engine 138 or other local AI engines to handle easier verification scenarios and then to export more difficult problems to external AI engines (e.g., remote server 158) having more sophisticated AI models, a more robust data repository, more processing resources, etc. In some embodiments, the AI accelerator 138 may perform one or more of pre-sorting, pre-computing, metadata analysis, that may be packaged and sent to the remote server 158 for additional analysis. As described above, multiple remote AI engines may be coupled to the scanner or remote server (e.g., via APIs) and the local analysis may be performed first to determine which of the remote AI engines may be most appropriate for a given situation identified by the local AI engine.

In some embodiments, different features identified by the system processor and/or AI engines may result in different confidence levels for satisfying the identification or validation analysis. For example, for items determined to have a higher potential price value, a higher confidence threshold may be used. In some such embodiments, the remote server with a more robust AI engine may be required as opposed to a less robust local AI engine in order to achieve the higher confidence level.

Figure 12:
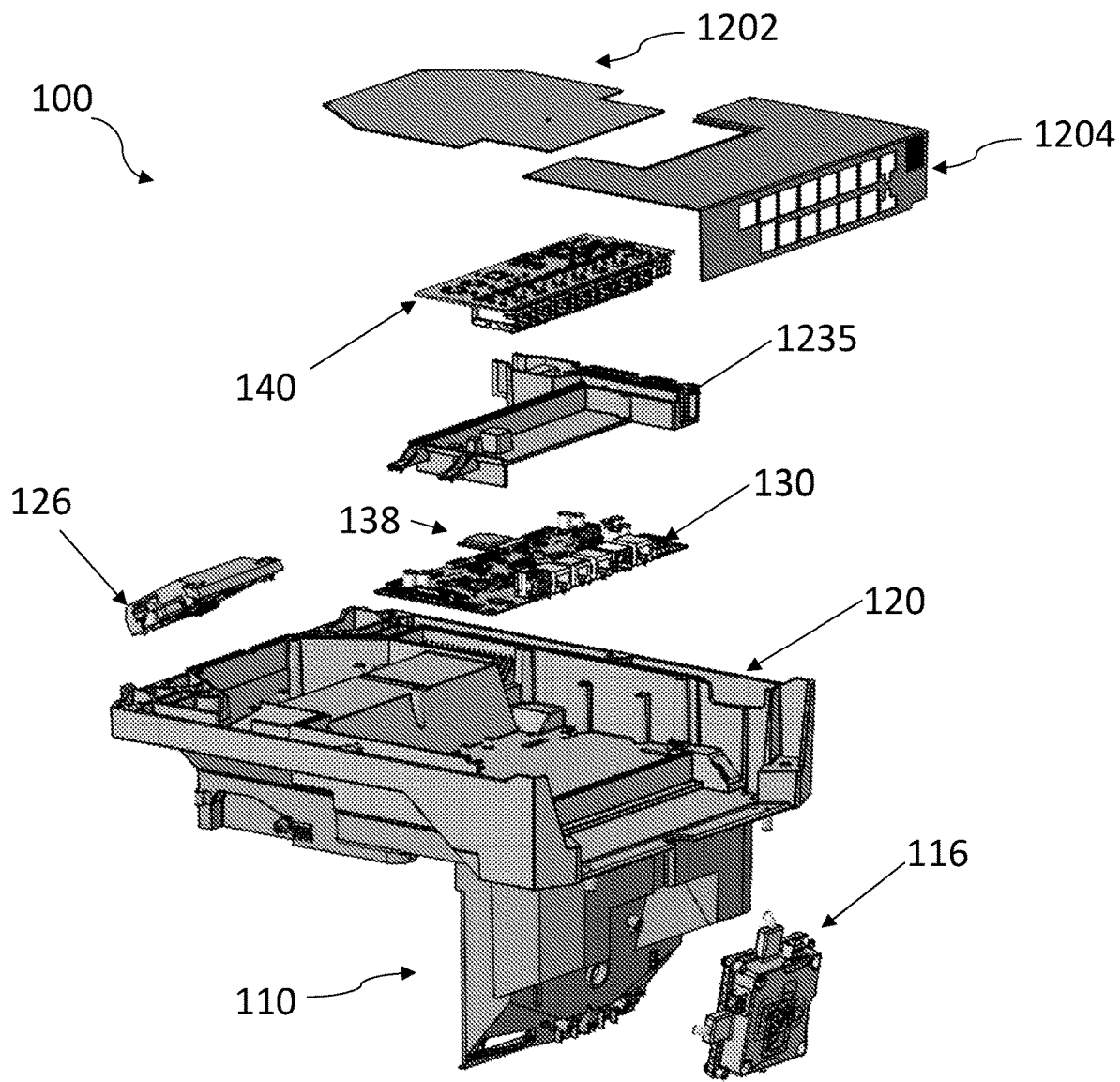
FIG. 12 is an exploded view of the data reader according to an embodiment of the disclosure having outer covers of the horizontal housing and vertical housing removed.

FIG. 12 is an exploded view of the data reader 100 according to an embodiment of the disclosure having outer covers of the horizontal housing 120 and vertical housing 110 removed. The data reader 100 is flipped in an upside-down orientation to better focus on the arrangements of the components within the horizontal housing 120. It should be noted that some components (e.g., monochrome cameras, LED illumination, etc.) are not shown for simplification of the view. The main board 130 may be disposed and mounted (e.g., via screws) within a void (i.e., cavity) within the lower chassis of the horizontal 120. The multi-port network switch 140 may be disposed within the void as well in a stacked arrangement between a surface of the lower chassis of the horizontal housing 120 and outer cover(s) 1202, 1204. Although the main board 130 is shown as being secured to rest against the lower chassis of the horizontal housing 120 with the multi-port network switch 140 secured on top of the main board 130, some embodiments may include the multi-port network switch 140 secured to rest against the lower chassis of the horizontal housing 120 with the main board 130 secured on top of the multi-port network switch 140.

The void wherein the main board 130 and the multi-port network switch 140 are located may be positioned proximate the back of the lower chassis of the horizontal housing 120 as shown in FIG. 12. A separate void (i.e., cavity) may be located proximate the front of the lower chassis of the horizontal housing 120 wherein the horizontal CCM may be disposed and secured to be pointed toward the window to capture images.

In some embodiments, a heatsink 1235 may be disposed between the main board 130 and the multi-port network switch 140 within the stacked arrangement. The heatsink 1235 may provide contacts to components on both the main board 130 and the multi-port network switch 140 to provide heat dissipation to the lower chassis of the horizontal housing 120. For example, a first side of the heatsink 1235 may contact the main board 130 and a second side of the heat sink 435 may contact the multi-port network switch 140. The heatsink 1235 may also contact the lower chassis of the horizontal housing 120 to provide heat management for both boards. Other heatsink arrangements are also contemplated.

Figure 13:
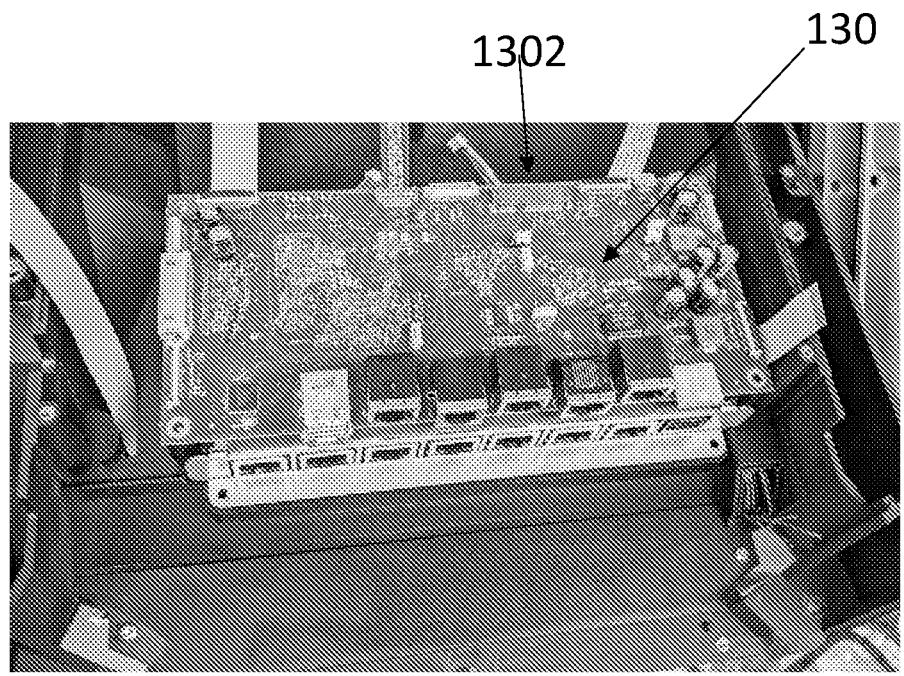
FIGS. 13 and 14 are images showing an example of the main board and the multi-port network switch secured to the horizontal housing in a stacked arrangement with the covers removed (FIG. 13) and with one cover secured in place (FIG. 14) of the stacked arrangement.
Figure 14:
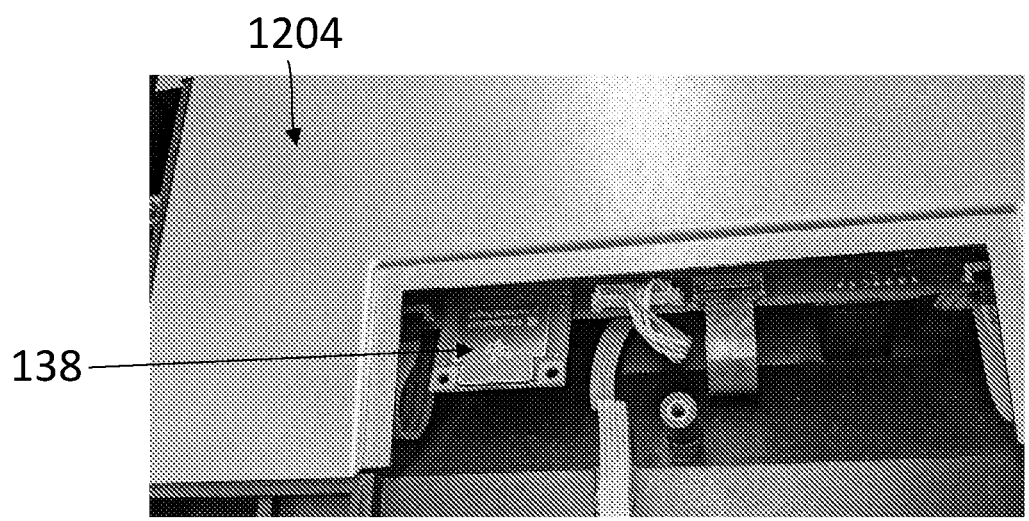

FIGS. 13 and 14 are images showing an example of the main board and the multi-port network switch secured to the horizontal housing in a stacked arrangement with the covers 1102, 1104 removed (FIG. 13), and with the second cover 404 secured in place over the stacked arrangement with the first cover 1102 removed (FIG. 14). The stacked arrangement in FIGS. 13 and 14 shows the multi-port network switch on the bottom of the stack with the main board being on the top of the stack in contrast to the arrangement shown in FIG. 12 with the multi-port network switch on the top of the stack with the main board being on the bottom of the stack when disposed and mounted within the lower chassis of the horizontal housing.

In addition, FIG. 13 shows mini PCIe connector slot 1302 mounted on the main board 130 for receiving AI accelerator module 138. FIG. 14 shows the AI accelerator module 138 being inserted into the mini PCIe connector slot mounted on the main board. Access to the PCIe connector slot may be provided by removing the first cover 1202 without needing to remove the second cover 1204. For embodiments in which the AI accelerator module 138 is connected to the main board 130 via an extension cable to be physically located within the vertical housing, the cable may be inserted into the PCIe connector slot and the cable may be routed with other cables from the main board 130 to the vertical housing 110 where the accelerator module 138 may be mounted. For embodiments in which the AI accelerator module 138 is connected to the main board 130 via an extension cable to be physically located within the horizontal housing, the cable may be inserted into the PCIe connector slot and the cable may be routed with other cables from the main board 130 to where the accelerator module 138 may be mounted.

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A fixed retail scanner including a data reader, comprising:
   a main board including one or more processors including a system processor disposed within the data reader;
   one or more camera modules disposed within the data reader and operably coupled with the system processor; and
   an artificial intelligence (AI) accelerator operably coupled with the system processor, wherein the system processor is configured to transmit image data received from the one or more camera modules responsive to one or more event triggers detected by the system processor, and wherein the AI accelerator is configured to perform AI analysis based on an AI engine local to the AI accelerator in response to the event trigger and a determined event trigger type.

2. The fixed retail scanner of claim 1, wherein the system processor is configured to act as a broker to determine which AI engine among a plurality of different AI engines is requested to perform AI analysis on the image data.

3. The fixed retail scanner of claim 2, wherein the plurality of different AI engines includes the local AI engine within the AI accelerator and at least one remote AI engine located within a remote server.

4. The fixed retail scanner of claim 1, wherein the image data includes time-correlated image frame data from a plurality of different camera views.

5. The fixed retail scanner of claim 4, wherein the AI accelerator is configured to detect a first feature within a first image frame captured by a first camera module and identify one or more additional features expected to be located in specific frames captured by additional camera modules based on at least a location or orientation of the first feature within the first frame.

6. The fixed retail scanner of claim 5, wherein the first feature is a barcode, wherein the one or more additional features includes one or more logos, package design features, colors, scale-invariant feature transform (SIFT) features, or visual pattern recognition (ViPR) features.

7. The fixed retail scanner of claim 1, wherein the AI accelerator is further configured to adjust a priority in the analysis performed by the AI engine based on data identified during a current transaction.

8. The fixed retail scanner of claim 7, wherein the data identified during the current transaction includes a temperature of a scanned item.

9. The fixed retail scanner of claim 7, wherein the data identified during the current transaction includes electronic article surveillance (EAS) tag data.

10. The fixed retail scanner of claim 7, wherein the AI accelerator is further configured to adjust the priority based on a customer's purchase history.

11. The fixed retail scanner of claim 7, wherein the AI accelerator is further configured to adjust the priority based on a previously scanned item during the current transaction.

12. The fixed retail scanner of claim 7, wherein the AI accelerator is further configured to adjust the priority based on a customer's detected movements throughout a store associated with the fixed retail scanner.

13. The fixed retail scanner of claim 7, wherein the AI accelerator is further configured to adjust the priority based on a sound detected by a microphone, the sound indicative of a packaging type for a product.

14. The fixed retail scanner of claim 7, wherein the AI accelerator is configured to disable one or more items from the AI engine based on current inventory data from a store associated with the fixed retail scanner.

15. A data reading system, comprising:
a fixed retail scanner comprising:
a main board including a system processor configured to perform decoding of barcodes on one or more items; and
an artificial intelligence (AI) accelerator having a local AI engine stored therein; and
a remote server operably coupled to the fixed retail scanner, the remote server having a remote AI engine stored therein, wherein the local AI engine within the fixed retail scanner is a simplified AI model relative to the remote AI engine within the remote server.

16. The data reading system of claim 15, further comprising: one or more camera modules configured to capture and transmit image data to at least one of the remote server or the AI accelerator.

17. The data reading system of claim 16, wherein the one or more camera modules include:
a printed circuit board that is separate from the main board;
an imager mounted on the printed circuit board of the one or more camera modules; and
an on-board camera AI accelerator separate from the AI accelerator, wherein the camera AI accelerator is mounted on the printed circuit board of the one or more camera modules, and wherein the AI accelerator having the local AI engine is mounted to the main board.

18. The data reading system of claim 16, wherein at least some of the one or more camera modules are peripheral cameras located external to the fixed retail scanner.

19. The data reading system of claim 15, wherein the local AI engine is trained to a specific store or store chain associated with the fixed retail scanner, and the remote AI engine is trained to a plurality of different customers.

20. The data reading system of claim 15, wherein the AI accelerator within the fixed retail scanner is configured to do first attempt to identify the item or validate the item based on the local AI engine, and the remote server is configured to attempt to do a second attempt to identify the item or validate the item based on the remote AI engine only after the first attempt by the local AI engine fails.

* * * * *